US008074145B2

(12) United States Patent
Josefiak et al.

(10) Patent No.: US 8,074,145 B2
(45) Date of Patent: Dec. 6, 2011

(54) MEMORY SYSTEM AND RELATED METHOD USING SOFTWARE-DEFINED RADIO WITH WRITE-PROTECTED, NON-VOLATILE MEMORY

(75) Inventors: Brent Josefiak, Rochester, NY (US); Glen Dragon, Pittsford, NY (US); David F. Carlson, Canandaigua, NY (US)

(73) Assignee: Harris Corporation, Melbourne, FL (US)

( * ) Notice: Subject to any disclaimer, the term of this patent is extended or adjusted under 35 U.S.C. 154(b) by 1045 days.

(21) Appl. No.: 11/938,358

(22) Filed: Nov. 12, 2007

(65) Prior Publication Data

US 2009/0125782 A1    May 14, 2009

(51) Int. Cl.
*H03M 13/00* (2006.01)
*G06F 13/00* (2006.01)
(52) U.S. Cl. .......................... 714/758; 711/163
(58) Field of Classification Search ................ 714/758, 714/763; 711/163
See application file for complete search history.

(56) References Cited

U.S. PATENT DOCUMENTS

| | | | |
|---|---|---|---|
| 5,914,543 A | 6/1999 | Scherpenberg et al. ...... 307/126 |
| 6,000,004 A | 12/1999 | Fukumoto ................. 711/103 |
| 6,109,528 A * | 8/2000 | Kunert et al. ............ 235/472.01 |
| 6,226,202 B1 * | 5/2001 | Kikuchi ................... 365/185.33 |
| 7,193,896 B2 | 3/2007 | Shiga ....................... 365/185.09 |
| 7,242,615 B2 | 7/2007 | Nagashima ............. 365/185.09 |
| 7,483,329 B2 * | 1/2009 | Luo et al. .................... 365/226 |
| 7,620,875 B1 * | 11/2009 | Nelson et al. ................ 714/763 |
| 7,765,426 B2 * | 7/2010 | Li ............................... 714/6.13 |
| 7,774,541 B2 * | 8/2010 | Shin et al. .................... 711/113 |
| 7,827,346 B2 * | 11/2010 | Anderson .................... 711/103 |
| 7,831,881 B2 * | 11/2010 | Eun et al. ..................... 714/746 |
| 7,864,578 B2 * | 1/2011 | Takada ..................... 365/185.09 |
| 7,903,459 B2 * | 3/2011 | Yu et al. .................... 365/185.03 |
| 7,913,033 B2 * | 3/2011 | Roohparvar ................ 711/103 |
| 7,930,507 B2 * | 4/2011 | Perry ........................... 711/167 |
| 7,962,824 B2 * | 6/2011 | Nakanishi et al. ........... 714/747 |
| 2006/0227624 A1 | 10/2006 | Shiga ....................... 365/189.01 |
| 2006/0245259 A1 | 11/2006 | Fukuda et al. ............ 365/185.22 |
| 2007/0087735 A1 | 4/2007 | March et al. ................. 455/419 |
| 2007/0150689 A1 | 6/2007 | Pandit et al. ................. 711/170 |

* cited by examiner

*Primary Examiner* — James C Kerveros
(74) *Attorney, Agent, or Firm* — Allen, Dyer, Doppelt, Milbrath & Gilchrist, P.A.

(57) ABSTRACT

A software-defined radio includes a radio circuit and an executable radio software system operable with the radio circuit and conforming to the software communications architecture (SCA) specification and defining an operating environment that allows a waveform application to operate with the radio circuit for transmitting and receiving voice and data. A write-protected non-volatile memory is operable with the radio circuit and executable radio software system. The non-volatile memory has a write enable controlled by a non-driver program for deferring a wear leveling correction sequence.

18 Claims, 6 Drawing Sheets

MEMORY SYSTEM AND RELATED METHOD USING SOFTWARE-DEFINED RADIO WITH WRITE-PROTECTED, NON-VOLATILE MEMORY

FIELD OF THE INVENTION

The present invention relates to write-protected, lossy non-volatile memory used in communications and memory systems and, more particularly, the present invention relates to communications and memory systems that use write-protected NAND in a Software-Defined Radio (SDR).

BACKGROUND OF THE INVENTION

Some multi-band or other tactical radios operate in the high frequency (HF), very high frequency (VHF) (for satellite communications), and ultra high frequency (UHF) bands. The range of these multi-band tactical radios can operate over about 2 through about 512 MHz frequency range. Next generation radios will probably cover about 2.0 to about 2,000 MHz (or higher) to accommodate high data rate waveforms and less crowded frequency bands. This high frequency transmit mode is governed by standards such as MIL-STD-188-141B, while data modulation/demodulation is governed by standards such as MIL-STD-188-110B, the disclosures which are incorporated by reference in their entirety.

UHF standards, on the other hand, provide different challenges over the 225 to about 512 MHz frequency range, including short-haul line-of-sight (LOS) communication and satellite communications (SATCOM) and cable. This type of propagation can be obtained through different weather conditions, foliage and other obstacles making UHF SATCOM an indispensable communications medium for many agencies. Different directional antennas can be used to improve antenna gain and improve data rates on the transmit and receive links. This type of communication is typically governed in one example by MIL-STD-188-181B, the disclosure which is incorporated by reference in its entirety. This standard specifies a family of constant and non-constant amplitude waveforms for use over satellite links.

The joint tactical radio system (JTRS) implements some of these standards and has different designs that use oscillators, mixers, switchers, splitters, combiners and power amplifier devices to cover different frequency ranges. The modulation schemes used for these types of systems can occupy a fixed bandwidth channel at a fixed carrier frequency or can be frequency-hopped. These systems usually utilize memoryless modulations, such as a phase shift keying (PSK), amplitude shift keying (ASK), frequency shift keying (FSK), quadrature amplitude modulation (QAM), or modulations with memory such as continuous phase modulation (CPM) and combine them with a convolutional or other type of forward error correction code. Standard waveforms are often used.

These different waveforms and equipment in the joint tactical radio system typically use a software-defined radio (SDR) that follows the open architecture framework defined by the software communications architecture (SCA), which provides the framework for how the hardware and software in the software-defined radio operate. The SCA is a key element of the JTRS and allows programmable radios to load waveforms, run applications and network into an integrated system using a core framework as a standard operating environment that is implemented on every hardware radio. The same waveform software can be ported to all radio sets.

Some current software-defined radios use a lossy, non-volatile storage medium such as NAND memory, which relies on the ability to erase and rewrite a block when an error correction code (ECC) or "soft" failure occurs. This is necessary to prevent a non-recoverable failure on a subsequent read. If the write enable pin of the storage medium, for example, the chip memory, is disabled by a third party outside the control of the normally used driver, the wear leveling correction sequence should be deferred. Therefore, a technique is required to prevent data loss in these circumstances.

SUMMARY OF THE INVENTION

A software-defined radio includes a radio circuit and an executable radio software system operable with the radio circuit and conforming to the software communications architecture (SCA) specification and defining an operating environment that allows a waveform application to operate with the radio circuit for transmitting and receiving voice and data. A write-protected non-volatile memory is operable with the radio circuit and executable radio software system and has a write enable controlled by a non-driver program such that a wear leveling correction sequence is deferred.

The write-protected non-volatile memory can be formed as a NAND memory and include a write-enable pin that is disabled by a third party outside the control of a driver used normally for wear leveling correction sequences.

In one aspect, the radio circuit is operable as an internet protocol (IP) data radio. The radio can include a RAM, a driver, and a file system for reading transaction requests on pages and blocks. The file system and driver retrieve a block as a suspect block upon detection of an Error Correction Code (ECC) after a page read and copy the suspect block into RAM for fulfilling file requests. The radio includes a writable non-volatile memory into which the suspect block is copied and later replaced after entering a write-enable mode. An integrity assurance program erases the suspect block and replaces and erased data within the write-protected, non-volatile memory from data within the writable non-volatile memory. An ECC correction triggers a copyout routine in one aspect. A cyclic redundancy check (CRC) error detection can be provided.

A method and memory system is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout, and prime notation is used to indicate similar elements in alternative embodiments.

It should be appreciated by one skilled in the art that the approach to be described is not limited for use with any particular communication standard (wireless or otherwise) and can be adapted for use with numerous wireless (or wired) communications standards such as Enhanced Data rates for GSM Evolution (EDGE), General Packet Radio Service (GPRS) or Enhanced GPRS (EGPRS), extended data rate Bluetooth, Wideband Code Division Multiple Access (WCDMA), Wireless LAN (WLAN), Ultra Wideband (UWB), coaxial cable, radar, optical, etc. Further, the invention is not limited for use with a specific PHY or radio type but is applicable to other compatible technologies as well.

Throughout this description, the term communications device is defined as any apparatus or mechanism adapted to transmit, receive or transmit and receive data through a medium. The communications device may be adapted to communicate over any suitable medium such as RF, wireless, infrared, optical, wired, microwave, etc. In the case of wireless communications, the communications device may comprise an RF transmitter, RF receiver, RF transceiver or any combination thereof. Wireless communication involves: radio frequency communication; microwave communication, for example long-range line-of-sight via highly directional antennas, or short-range communication; and/or infrared (IR) short-range communication. Applications may involve point-to-point communication, point-to-multipoint communication, broadcasting, cellular networks and other wireless networks.

As will be appreciated by those skilled in the art, a method, data processing system, or computer program product can embody different examples in accordance with a non-limiting example of the present invention. Accordingly, these portions may take the form of an entirely hardware embodiment, an entirely software embodiment, or an embodiment combining software and hardware aspects. Furthermore, portions may be a computer program product on a computer-usable storage medium having computer readable program code on the medium. Any suitable computer readable medium may be utilized including, but not limited to, static and dynamic storage devices, hard disks, optical storage devices, and magnetic storage devices.

The description as presented below can apply with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Although the memory system, method and device, for example, software-defined radio, as described can be operable in many different devices that use NAND technology, but is especially applicable to software-defined radios and similar equipment using internet protocol (IP) stacks in their main General Purpose Processor (GPP) and are required to control their NAND write with a security or performance application. It would also be applicable to any device using NAND or similar lossy medium whose write enable is controlled by a third party.

Software-defined radios often use NAND as a medium for a flash memory. Although different NAND technologies are available, typically NAND uses tunnel injection for writing and tunnel release for erasing. NAND memory is commonly termed flash memory and has a finite number of erase-write cycles, which could be offset by some chip firmware or file system drivers for counting the writes and dynamically remapping the blocks in order to spread the write operations between sectors, using a technique called wear leveling correction. Sometimes the NAND systems perform write verification and remapping to spare sectors in case of a write failure using bad block management (BBM) techniques.

It is known that each read operation within a NAND flash block weakens the charge that maintains the data bits. As a result, bits could be lost after numerous reads, e.g., more than 100,000 reads in some instances. Weak blocks typically are marked for refresh before that read limit is reached, however. In these instances, the data could be copied from a new flash block to erase the weak block while the erase recharges the flash block. Some file systems also perform (Error Correction Code (ECC) computations on all write and read operations to recover from single-bit errors that may occur. ECC, however, does not typically work when many bits are damaged as a result of a power failure during a write operation. In this instance, the file system typically should perform a Cyclic Redundancy Check (CRC) on each transaction to detect corrupted data. If an error is detected, the file system can use the ECC error correction to recover the data to a new block and mark the weak block for erasing.

These systems incorporate dynamic wear leveling correction techniques that spread erase cycles evenly over the device to increase the life of a flash memory. Cell phones typically use this technology and wear leveling correction techniques.

Software-defined radios, however, typically have security constraints. The normal wear leveling correction techniques common in cell phones are typically not possible. The write enabled pin of the chip typically is disabled by a third party outside the control of the driver. As a result, the wear leveling correction sequence must be deferred. This occurs such as in some Falcon III software-defined radios manufactured by Harris Corporation.

Some current solutions to this problem rely on the driver immediately enabling the write enable pin and initiating a wear leveling correction algorithm. These solutions require the write enable pin to be controlled by the medium driver and not a third party. Current implementations also require knowledge of the file system or its direct intervention. For example, the Falcon III manpack (MP) radio uses NAND memory and an internet protocol (IP) data radio as a software-defined radio. The current performance and security requirements dictate that the write enable be controlled by a non-driver entity for security constraints, creating problems with the wear leveling correction sequence, which is deferred.

Current drivers used in some system typically are open source as provided by vendors. These drivers detect when wear leveling should occur. Unfortunately, systems incorporating these drivers do not have a system for deferring the wear leveling correction sequence. These open source systems toggle the pin and control the write enable immediately if it is not already set. The entity that controls the driver also can toggle the pin in the prior art systems, but this is not available in some advanced software-defined radios as noted above since the third party controls these operations. Even if a write is attempted, it will not occur. If it is not accomplished at some point, the file system could become corrupted.

Figure 1:
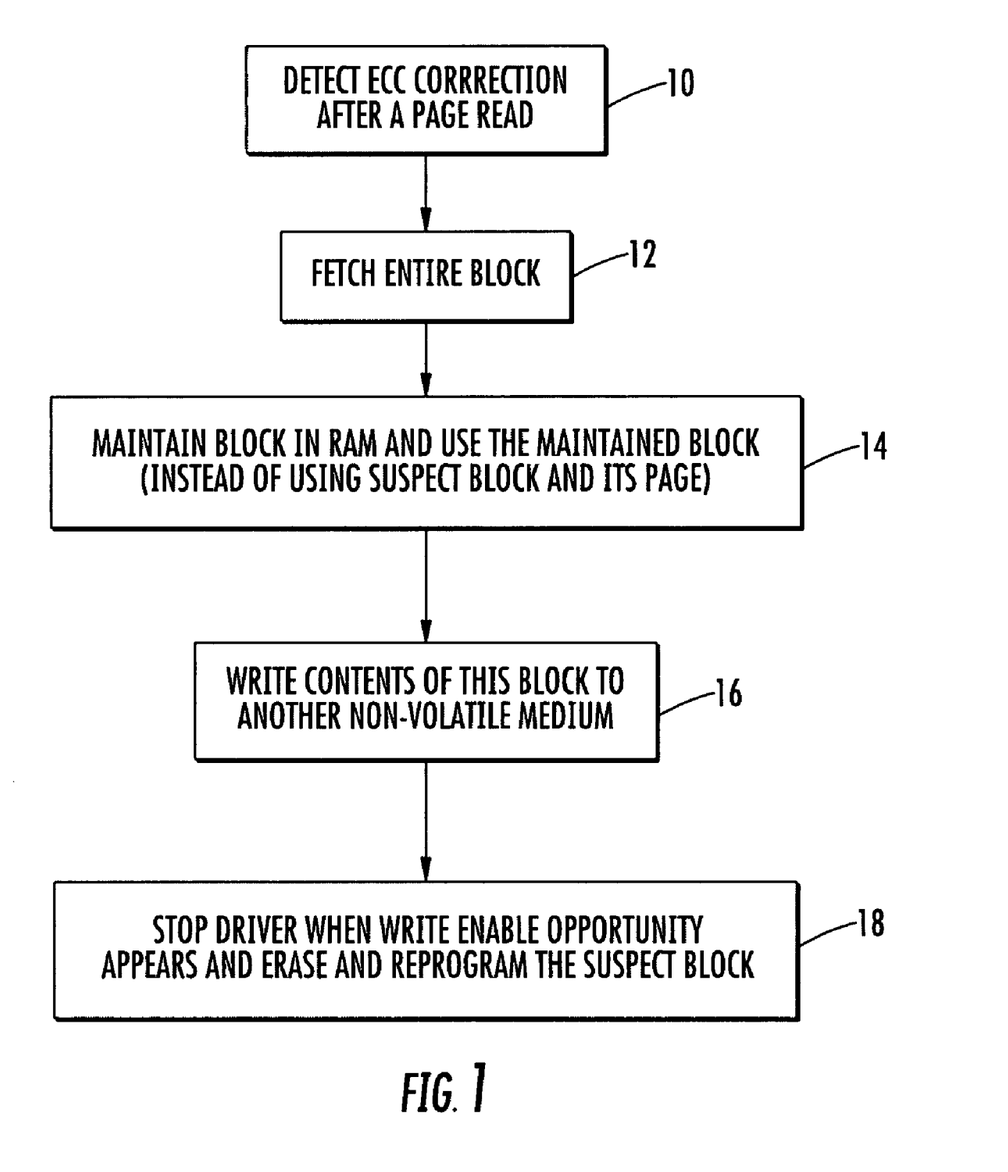
FIG. 1 is a high-level flowchart showing an example of a method used for handling soft failures on a write protected non-volatile medium such as a NAND memory in accordance with a non-limiting example of the present invention.

FIG. 1 is a high-level flowchart illustrating a basic algorithm or steps used in one non-limiting example for handling soft failures in the write protected lossy non-volatile medium such as a NAND memory (flash memory) used in a software-defined radio, for example, which overcomes those problems as described above. The ECC correction is first detected after a page read (block 10). The entire block is fetched (block 12). This block is maintained in RAM and the maintained block is used instead of the suspect block and its page (block 14). The contents of this block are written to another non-volatile medium (block 16). The drivers stop when the write enable opportunity appears and the suspect block is erased and reprogrammed (block 18) such as using a separate program.

During the power cycle, there could be two operations. All requests to that block could be serviced throughout the RAM copy. During the same power cycle, there is an opportunity to reprogram and use the RAN copy. If the radio is started after it has been off, the block that may have been placed into the other non-volatile region can be taken into the drive initialization and placed into its proper place.

The system maintains a copy for quick access when the file system comes in and can be accomplished independent of the file system's knowledge. The file system appears to be talking to the hardware component and the file system will use the RAM copy for the remainder of the power cycle at that time. This prepares the file system for power loss or a power cycle so that it can recover that same information.

Figure 2:
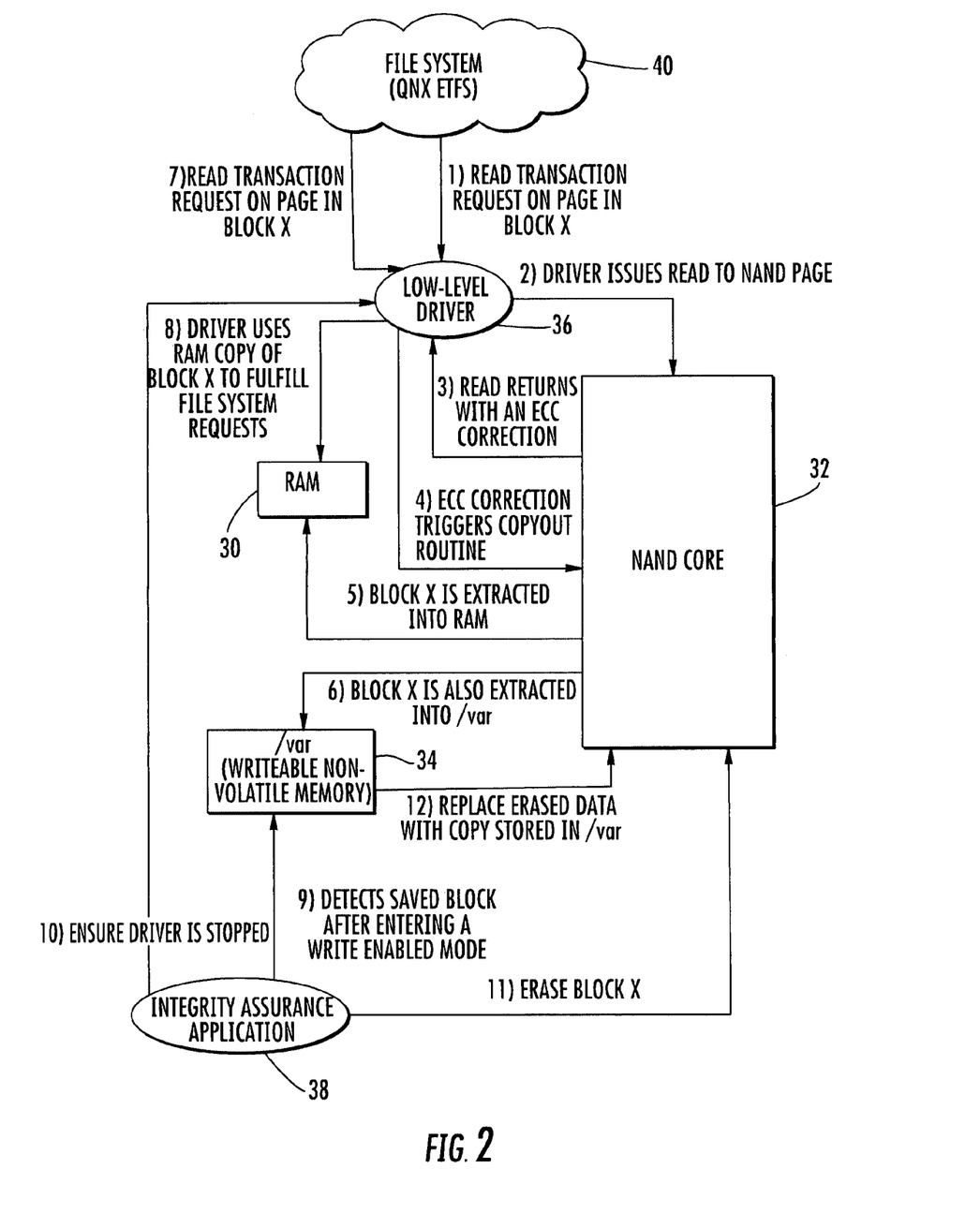
FIG. 2 is a high-level block diagram illustrating basic hardware and software components and the interaction among these hardware and software components in accordance with a non-limiting example of the present invention.

FIG. 2 is a high-level diagram showing basic software and hardware components used in the system described by the algorithm of FIG. 1 and showing the example of sequential steps used for different components. The rectangular blocks correspond to hardware components such as the RAM 30, NAND core 32 as a flash memory, and the writable non-volatile memory 34 given the designation/var. Software components include the low-level driver 36 and the integrity assurance application 38 that operates as part of the memory repair process, but separated as a different program from the low-level driver 36. Thus, its function is kept separate from the driver. Low-level hardware dependencies come from the low-level driver. The file system 40 corresponds to an embedded transactional file system (ETFS) such as provided by QNX Software Systems. The ETFS is a fault-tolerant, embedded transactional file system for NAND flash memory devices and uses a transactional update model that provides integrity where there is an unexpected loss of power. The embedded transaction file system 40 can resist power failure with transaction-based programming to ensure that bad blocks cannot effect copying operations. It can provide CRC error detection on each transaction with a roll back support. A weak block can be marked for erasing when an error is detected. Read degradation monitoring can occur with blocks marked for refresh before hitting a normal read degradation limit to avoid possible ECC errors and the need to recover data. There is a reduced metadata corruption and a reduced number of writes needed for metadata. Defragmentation can occur with write buffering to consolidate small write transactions before they are written to NAND to avoid fragmentation. Factory-marked bad blocks can be reserved and unused. Different size blocks, such as 512-byte and 2,048-byte blocks can be supported.

FIG. 2 also illustrates a non-limiting sequence that is numbered from 1-12 with the arrows indicating the sequence of operations between the different hardware and software components.

As shown in the flow sequence of FIG. 2, a read transaction request can occur on a page in block X from the file system 40 to the low-level driver 36. The driver 36 can issue a read to the NAND page and the NAND core 32 read returns with an ECC correction to the low-level driver 36. The ECC correction triggers a copy out routine from the low-level driver 36 to the NAND core 32. Block X is extracted into RAM 30 and block X is also extracted into the writable non-volatile memory 34. The read transaction request on the page in block X occurs from the file system 40 to the low-level driver 36, which uses the RAM copy of block X to fulfill the file system requests. The integrity assurance application 38 detects the saved block after entering a write enabled mode and ensures that the driver operation is stopped from the integrity assurance application to the low-level driver 36. Block X is erased, followed by replacing the erased data with a copy stored in the writable non-volatile memory 34.

The system as described provides several advantages, including but not limited to, solving limits placed on the storage when it has been write enable controlled by a third party, other than its driver such as used in software-defined radios and NAND core technology. The system has the advantage of being invisible to the file system and does not require any knowledge of the file ID's/tables or wear leveling algorithm. This solution also solves the potential corruption issue during run-time and on subsequent power cycles. Deferment of heavy input/output operations is also a major performance advantage during critical regions.

It should be understood that when the system fixes a block, it is typically a computationally intensive period where the processor is devoted to reading out the pages, storing information in RAM, recalculating the ECC, and replacing it. This creates a high processing burden and there are times when running an application is time critical and the system should not perform this maintenance as it happens. For example, an aircraft could have its processing and telemetry systems working on time critical applications and communicating with a satellite and/or ground stations. When failures occur on less critical systems, the correction of these less critical systems can be deferred until a more reasonable time occurs.

For purposes of description relative to software-defined radios, some background information on coding, interleaving, and an exemplary wireless, mobile radio communications system that includes ad-hoc capability and can be modified for use is set forth. This example of a communications system that can be used and modified for use with the present invention is now set forth with regard to FIGS. 3 and 4.

An example of a radio that could be used with such system and method as described above is a Falcon™ III radio manufactured and sold by Harris Corporation of Melbourne, Fla. This type of radio can support multiple wavebands form 30 MHz up to 2 GHz, including L-band SATCOM and MANET. The waveforms can provide secure IP data networking. It should be understood that different radios can be used, including software-defined radios that can be typically implemented with relatively standard processor and hardware components. One particular class of software radio is the Joint Tactical Radio (JTR), which includes relatively standard radio and processing hardware along with any appropriate waveform software modules to implement the communication waveforms a radio will use. JTR radios also use operating system software that conforms with the software communications architecture (SCA) specification (see www.jtrs.saalt-.mil), which is hereby incorporated by reference in its entirety, The SCA is an open architecture framework that specifies how hardware and software components are to interoperate so that different manufacturers and developers can readily integrate the respective components into a single device.

The Joint Tactical Radio System (JTRS) Software Component Architecture (SCA) defines a set of interfaces and protocols, often based on the Common Object Request Broker Architecture (CORBA), for implementing a Software-Defined Radio (SDR). In part, JTRS and its SCA are used with a family of software re-programmable radios. As such, the SCA is a specific set of rules, methods, and design criteria for implementing software re-programmable digital radios.

The JTRS SCA specification is published by the JTRS Joint Program Office (JPO). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OE) and specifies the services and interfaces that applications use from that environment. The SCA OE comprises a Core Framework (CF), a CORBA middleware, and an Operating System (OS) based on the Portable Operating System Interface (POSIX) with associated board support packages. The JTRS SCA also provides a building block structure (defined in the API Supplement) for defining application programming interfaces (APIs) between application software components.

The JTRS SCA Core Framework (CF) is an architectural concept defining the essential, "core" set of open software Interfaces and Profiles that provide for the deployment, management, interconnection, and intercommunication of software application components in embedded, distributed-computing communication systems. Interfaces may be defined in the JTRS SCA Specification. However, developers may implement some of them, some may be implemented by non-core applications (i.e., waveforms, etc.), and some may be implemented by hardware device providers.

Figure 3:
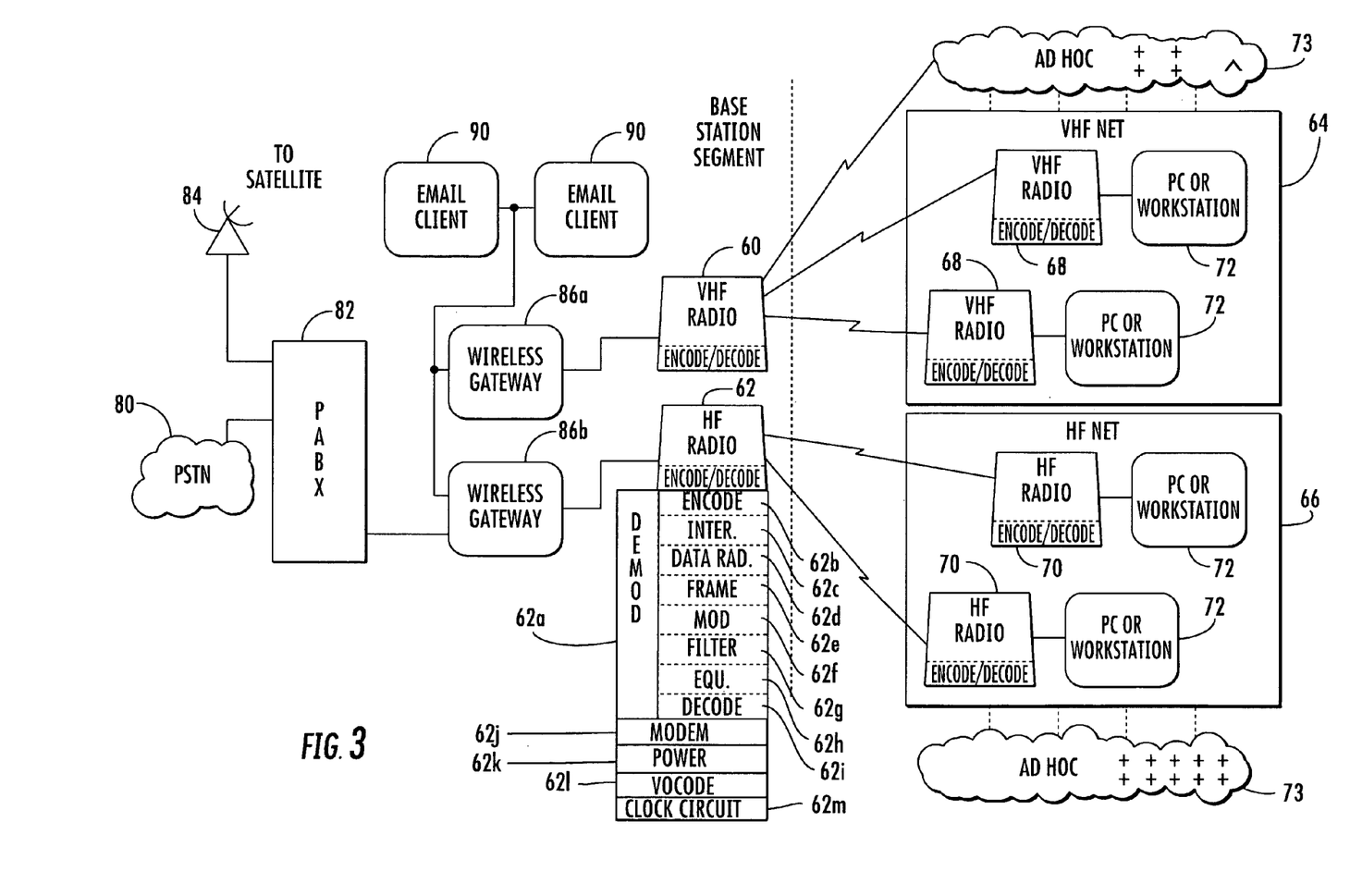
FIG. 3 is a block diagram of an example of a communications system that can be used in accordance with a non-limiting example of the present invention.

For purposes of description only, a brief description of an example of a communications system that includes communications devices that incorporate the filter in accordance with a non-limiting example, is described relative to a non-limiting example shown in FIG. 3. This high-level block diagram of a communications system includes a base station segment and wireless message terminals that could be modified for use with the present invention. The base station segment includes a VHF radio 60 and HF radio 62 that communicate and transmit voice or data over a wireless link to a VHF net 64 or HF net 66, each which include a number of respective VHF radios 68 and HF radios 70, and personal computer workstations 72 connected to the radios 68, 70. Ad-hoc communication networks 73 are interoperative with the various components as illustrated. The entire network can be ad-hoc and include source, destination and neighboring mobile nodes. Thus, it should be understood that the HF or VHF networks include HF and VHF net segments that are infrastructure-less and operative as the ad-hoc communications network. Although UHF and higher frequency radios and net segments are not illustrated, these could be included.

The radio can include a demodulator circuit 62*a* and appropriate convolutional encoder circuit 62*b*, block interleaver 62*c*, data randomizer circuit 62*d*, data and framing circuit 62*e*, modulation circuit 62*f*, matched filter circuit 62*g*, block or symbol equalizer circuit 62*h* with an appropriate clamping device, deinterleaver and decoder circuit 62*i* modem 62*j*, and power adaptation circuit 62*k* as non-limiting examples. A vocoder circuit 62*l* can incorporate the decode and encode functions and a conversion unit could be a combination of the various circuits as described or a separate circuit. A clock circuit 62*m* can establish the physical clock time and through second order calculations as described below, a virtual clock time. The network can have an overall network clock time. These and other circuits operate to perform any functions necessary for the present invention, as well as other functions suggested by those skilled in the art. Other illustrated radios, including all VHF (or UHF) and higher frequency mobile radios and transmitting and receiving stations can have similar functional circuits. Radios could range from 30 MHz to about 2 Hz as non-limiting examples.

The base station segment includes a landline connection to a public switched telephone network (PSTN) 80, which connects to a PABX 82. A satellite interface 84, such as a satellite ground station, connects to the PABX 82, which connects to processors forming wireless gateways 86*a*, 86*b*. These interconnect to the VHF radio 60 or HF radio 62, respectively. The processors are connected through a local area network to the PABX 82 and e-mail clients 90. The radios include appropriate signal generators and modulators.

An Ethernet/TCP-IP local area network could operate as a "radio" mail server. E-mail messages could be sent over radio links and local air networks using STANAG-5066 as second-generation protocols/waveforms, the disclosure which is hereby incorporated by reference in its entirety and, of course, preferably with the third-generation interoperability standard: STANAG-4538, the disclosure which is hereby incorporated by reference in its entirety. An interoperability standard FED-STD-1052, the disclosure which is hereby incorporated by reference in its entirety, could be used with legacy wireless devices. Examples of equipment that can be used in the present invention include different wireless gateway and radios manufactured by Harris Corporation of Melbourne, Fla. This equipment could include RF5800, 5022, 7210, 5710, 5285 and PRC 117 and 138 series equipment and devices as non-limiting examples.

These systems can be operable with RF-5710A high-frequency (HF) modems and with the NATO standard known as STANAG 4539, the disclosure which is hereby incorporated by reference in its entirety, which provides for transmission of long distance radio at rates up to 9,600 bps. In addition to modem technology, those systems can use wireless email products that use a suite of data-link protocols designed and perfected for stressed tactical channels, such as the STANAG 4538 or STANAG 5066, the disclosures which are hereby incorporated by reference in their entirety. It is also possible to use a fixed, non-adaptive data rate as high as 19,200 bps with a radio set to ISB mode and an HF modem set to a fixed data rate. It is possible to use code combining techniques and ARQ.

Figure 4:
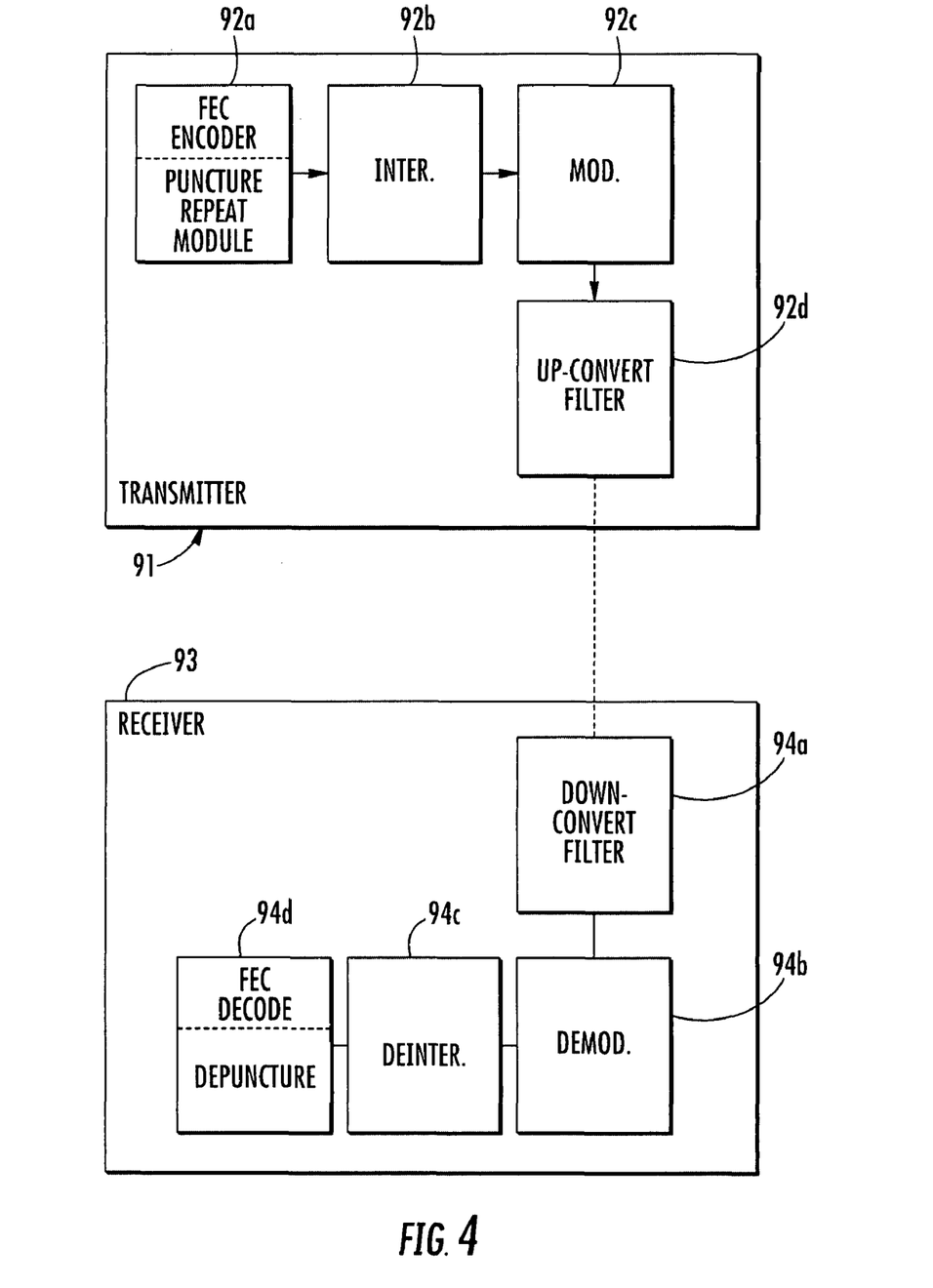
FIG. 4 is a high-level block diagram showing basic components that can be used in accordance with a non-limiting example of the present invention.

A communications system that incorporates communications devices can be used in accordance with non-limiting examples of the present invention and is shown in FIG. 4. A transmitter is shown at 91 and includes basic functional circuit components or modules, including a forward error correction encoder 92a that includes a puncturing module, which could be integral to the encoder or a separate module. The decoder 92a and its puncturing module includes a function for repeating as will be explained below. Encoded data is interleaved at an interleaver 92b, for example, a block interleaver, and in many cases modulated at modulator 92c. This modulator can map the communications data into different symbols based on a specific mapping algorithm to form a communications signal. For example, it could form Minimum Shift Keying or Gaussian Minimum Shift Keying (MSK or GMSK) symbols. Other types of modulation could be used in accordance with non-limiting examples of the present invention. Up-conversion and filtering occurs at an up-converter and filter 92d, which could be formed as an integrated module or separate modules. Communications signals are transmitted, for example, wirelessly to receiver 93.

At the receiver 93, down conversion and filtering occurs at a down converter and filter 94a, which could be integrated or separate modules. The signal is demodulated at demodulator 94b and deinterleaved at deinterleaver 94c. The deinterleaved data (i.e. bit soft decisions) is decoded and depunctured (for punctured codes), combined (for repeated codes) and passed through (for standard codes) at decoder 94d, which could include a separate or integrated depuncturing module. The system, apparatus and method can use different modules and different functions. These components as described could typically be contained within one transceiver.

It should be understood, in one non-limiting aspect of the present invention, a rate 1/2, K=7 convolutional code can be used as an industry standard code for forward error correction (FEC) during encoding. For purposes of understanding, a more detailed description of basic components now follows. A convolutional code is an error-correcting code, and usually has three parameters (n, k, m) with n equal to the number of output bits, k equal to the number of input bits, and m equal to the number of memory registers, in one non-limiting example. The quantity k/n could be called the code rate with this definition and is a measure of the efficiency of the code. K and n parameters can range from 1 to 8, m can range from 2 to 10, and the code rate can range from 1/8 to 7/8 in non-limiting examples. Sometimes convolutional code chips are specified by parameters (n, k, L) with L equal to the constraint length of the code as L=k (m−1). Thus, the constraint length can represent the number of bits in an encoder memory that would affect the generation of n output bits. Sometimes the letters may be switched depending on the definitions used.

The transformation of the encoded data is a function of the information symbols and the constraint length of the code. Single bit input codes can produce punctured codes that give different code rates. For example, when a rate 1/2 code is used, the transmission of a subset of the output bits of the encoder can convert the rate 1/2 code into a rate 2/3 code. Thus, one hardware circuit or module can produce codes of different rates. Punctured codes allow rates to be changed dynamically through software or hardware depending on channel conditions, such as rain or other channel impairing conditions.

An encoder for a convolutional code typically uses a look-up table for encoding, which usually includes an input bit as well as a number of previous input bits (known as the state of the encoder), the table value being the output bit or bits of the encoder. It is possible to view the encoder function as a state diagram, a tree diagram or a trellis diagram.

Decoding systems for convolutional codes can use 1) sequential decoding, or 2) maximum likelihood decoding, also referred to as Viterbi decoding, which typically is more desirable. Sequential decoding allows both forward and backward movement through the trellis. Viterbi decoding as maximum likelihood decoding examines a receive sequence of given length, computes a metric for each path, and makes a decision based on the metric.

Puncturing convolutional codes is a common practice in some systems and is used in accordance with non-limiting examples of the present invention. It should be understood that in some examples a punctured convolutional code is a higher rate code obtained by the periodic elimination of specific code bits from the output of a low rate encoder. Punctured convolutional code performance can be degraded compared with original codes, but typically the coding rate increases.

Some of the basic components that could be used as non-limiting examples of the present invention include a transmitter that incorporates a convolutional encoder, which encodes a sequence of binary input vectors to produce the sequence of binary output vectors and can be defined using a trellis structure. An interleaver, for example, a block interleaver, can permute the bits of the output vectors. The interleaved data would also be modulated at the transmitter (by mapping to transmit symbols) and transmitted. At a receiver, a demodulator demodulates the signal.

A block deinterleaver recovers the bits that were interleaved. A Viterbi decoder could decode the deinterleaved bit soft decisions to produce binary output data.

Often a Viterbi forward error correction module or core is used that would include a convolutional encoder and Viterbi decoder as part of a radio transceiver as described above. For example if the constraint length of the convolutional code is 7, the encoder and Viterbi decoder could support selectable code rates of 1/2, 2/3, 3/4, 4/5, 5/6, 6/7, 7/8 using industry standard puncturing algorithms.

Different design and block systems parameters could include the constraint length as a number of input bits over which the convolutional code is computed, and a convolutional code rate as the ratio of the input to output bits for the convolutional encoder. The puncturing rate could include a ratio of input to output bits for the convolutional encoder using the puncturing process, for example, derived from a rate 1/2 code.

The Viterbi decoder parameters could include the convolutional code rate as a ratio of input to output bits for the convolutional encoder. The puncture rate could be the ratio of input to output bits for the convolutional encoder using a puncturing process and can be derived from a rate 1/2 mother code. The input bits could be the number of processing bits for the decoder. The Viterbi input width could be the width of input data (i.e. soft decisions) to the Viterbi decoder. A metric register length could be the width of registers storing the metrics. A trace back depth could be the length of path required by the Viterbi decoder to compute the most likely decoded bit value. The size of the memory storing the path metrics information for the decoding process could be the memory size. In some instances, a Viterbi decoder could include a First-In/First-Out (FIFO) buffer between depuncture and Viterbi function blocks or modules. The Viterbi output width could be the width of input data to the Viterbi decoder.

The encoder could include a puncturing block circuit or module as noted above. Usually a convolutional encoder may have a constraint length of 7 and take the form of a shift register with a number of elements, for example, 6. One bit can be input for each clock cycle. Thus, the output bits could be defined by a combination of shift register elements using a standard generator code and be concatenated to form an encoded output sequence. There could be a serial or parallel byte data interface at the input. The output width could be programmable depending on the punctured code rate of the application.

A Viterbi decoder in non-limiting examples could divide the input data stream into blocks, and estimate the most likely data sequence. Each decoded data sequence could be output in a burst. The input and calculations can be continuous and require four clock cycles for every two bits of data in one non-limiting example. An input FIFO can be dependent on a depuncture input data rate.

It should also be understood that embodiments of the present invention is not limited to convolutional codes and similar FEC, but also turbo codes could be used as high-performance error correction codes or low-density parity-check codes that approach the Shannon limit as the theoretical limit of maximum information transfer rate over a noisy channel. Thus, some available bandwidth can be increased without increasing the power of the transmission. Instead of producing binary digits from the signal, the front-end of the decoder could be designed to produce a likelihood measure for each bit.

Figure 5:
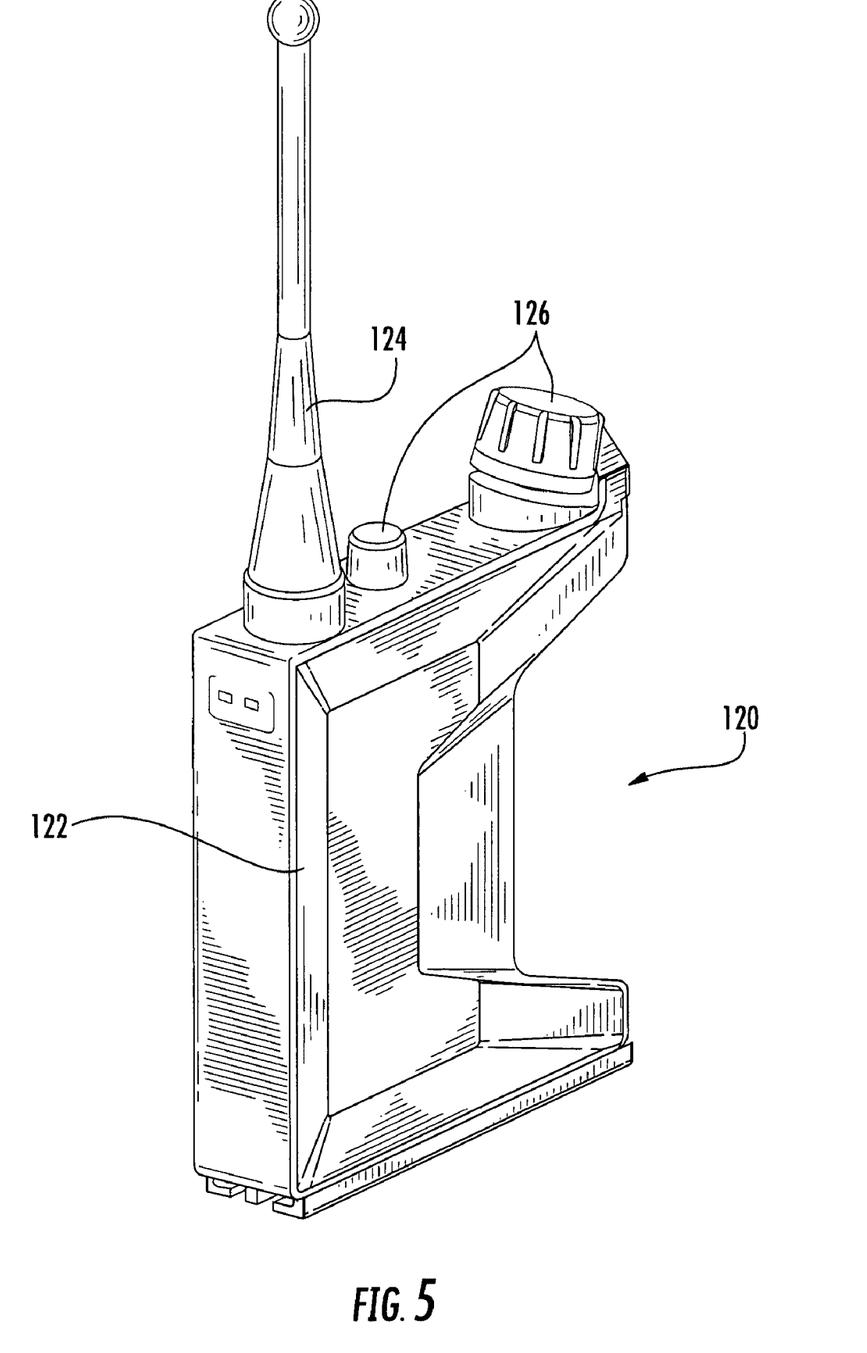
FIG. 5 is a perspective view of a portable wireless communications device as a handheld radio that could incorporate the communications system and NAND in accordance with a non-limiting example of the present invention.

The system in accordance with non-limiting examples of the present invention can be used in multiprocessor embedded systems and related methods and also used for any type of radio software communications architecture as used on mainframe computers or small computers, including laptops with an added transceiver, such as used by military and civilian applications, or in a portable wireless communications device 120 as illustrated in FIG. 5. The portable wireless communications device is illustrated as a radio that can include a transceiver as an internal component and handheld housing 122 with an antenna 124 and control knobs. A Liquid Crystal Display (LCD) or similar display can be positioned on the housing in an appropriate location for display. The various internal components, including dual processor systems for red and black subsystems and software that is conforming with SCA, is operative with the illustrated radio. Although a portable or handheld radio is disclosed, the architecture as described can be used with any processor system operative in accordance with non-limiting examples of the present invention. An example of a communications device, in accordance with non-limiting examples of the present invention, is the Falcon® III manpack or tactical radio platform manufactured by Harris Corporation of Melbourne, Fla.

For purposes of description, a typical high frequency communications system used for transmitting and receiving digital data is described with reference to FIG. 6. This system can communicate using different standards and waveforms, including waveforms pertaining to the MIL-STD-188-110B standard. The system and method can employ this technology and adopt it and apply the NAND system described above in accordance with a non-limiting example of the present invention.

Figure 6:
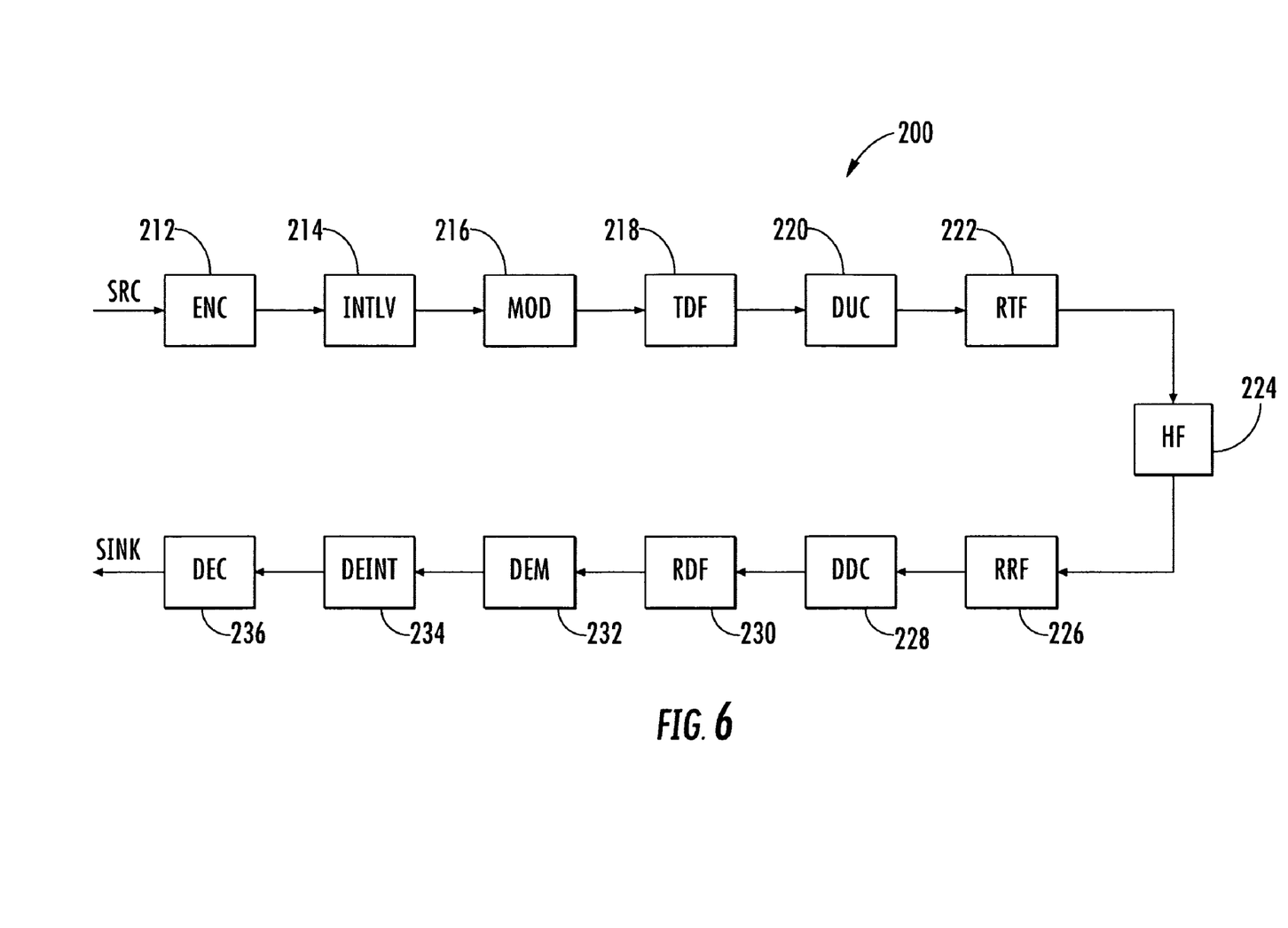
FIG. 6 is a block diagram of an example of a typical high frequency communication system showing different modulators and demodulators, filters, interleavers and deinterleavers, and forward error correction (FEC) encoders and decoders.

As shown in FIG. 6 for this typical HF communications system 200 at a transmit section, a data stream (Src) that is to be transmitted is forwarded as 1's and 0's as is typical. The encoder 212 is operative as a Forward Error Correction (FEC) encoder and applies a FEC algorithm to the data, which passes to an interleaver 214, which interleaves the data, which is then modulated by a modulator 216. In some prior art systems having similar functions, differential modulation is applied at this point. The present invention can use coherent modulation in the modulator 216, for example. The modulator 216 could be a two, four or eight PSK modulator as a non-limiting example. Mini probe sequences can also be applied. The data is passed into a transmit digital low-pass filter 218, and the data is up-converted by a digital up-conversion circuit 200 from baseband to an 1800 Hz carrier in this one non-limiting example. A radio transmit filter (RTF) 222 limits the bandwidth of the transmit waveform to about 3 KHz. The data is passed to a high frequency, multi-path and fading channel simulator circuit (meant to simulate an HF channel) 224, where multi-path is modeled as a tapped-delay line, and each tap in the tapped-delay line has fading characteristics based on the Watterson model.

At a receiver section, a radio receive filter 226 limits the bandwidth of the data signal to about 3 KHz. The data is digitally down-converted in the converter 228 from 1800 Hz carrier to baseband in this non-limiting example. The data passes into a receive digital low-pass filter 230 that is ideally the same as the transmit digital low-pass filter (TDF) 218. The demodulation occurs followed by deinterleaving within a deinterleaver circuit 234. The forward error correction (FEC) decoder circuit 236 decodes the data and passes it as a received bit stream (Sink).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A software-defined radio, comprising:
a radio circuit;
an executable radio software system operable with the radio circuit and conforming to the Software Communications Architecture (SCA) specification and defining an operating environment that allows a waveform application to operate with the radio circuit for transmitting and receiving voice and data; and
a write protected non-volatile memory operable with the radio circuit and executable radio software system and having a write enable controlled by a non-driver program for deferring a wear leveling correction sequence and further comprising a RAM, a writeable non-volatile memory, and a file system and driver for reading transaction requests on pages in blocks, wherein said file system and driver are configured to:
retrieve a block as a suspect block upon detection of an Error Correction Code (ECC) after a page read;
copy the suspect block into RAM where it is maintained for fulfilling file requests;
copy the subject block into the writeable non-volatile memory;
erase the stored data corresponding to the subject block from the write-protected non-volatile memory after entering a write enabled mode; and
replace the erased data with a copy of the data stored in the writeable, non-volatile memory.

2. The software-defined radio according to claim 1, wherein said write protected non-volatile memory comprises a NAND memory.

3. The software-defined radio according to claim 1, wherein said write protected non-volatile memory includes a write enable pin that is disabled by a third party outside the control of a driver used normally for wear leveling correction sequences.

4. The software-defined radio according to claim 1, wherein said radio circuit is operable as an Internet protocol (IP) data radio.

5. The software-defined radio according to claim 1, and further comprising an integrity assurance program that erases the suspect block and replaces any erased data within the write protected non-volatile memory from data within the writeable non-volatile memory.

6. The software-defined radio according to claim 1, wherein an ECC correction triggers a copyout routine.

7. The software-defined radio according to claim 1, wherein said file system is operable for providing a cyclic redundancy check (CRC) error detection.

8. A method for controlling memory within a software-defined radio that includes a radio circuit and an executable radio software system operable with the radio circuit and conforming to the Software Communications Architecture (SCA) specification and defining an operating environment that allows a waveform application to operate with the radio circuit for transmitting and receiving voice and data, said radio circuit further comprising a write protected non-volatile memory operable with the radio circuit and executable radio software system and having a write enable controlled by a non-driver program for deferring a wear leveling correction sequence comprising:
returning an error correction code (ECC) after reading the write protected non-volatile memory,
reading transaction requests on pages in blocks and retrieving a block as a suspect block upon detection of an Error Correction Code (ECC) after a page read;
copying the suspect block into a RAM where it is maintained for fulfilling file requests and also into a writeable non-volatile memory;
erasing the suspect block from the write-protected non-volatile memory after entering a write enabled mode; and
replacing any erased data within a write protected non-volatile memory from data in the writeable non-volatile memory.

9. The method according to claim 8, which further comprises disabling a write enable pin normally used for wear leveling correction such that the write enable pin is controlled by a third party outside the control of a driver normally used in controlling the wear leveling correction.

10. The method according to claim 8, which further comprises triggering a copyout routine after an ECC correction.

11. The method according to claim 8, which further comprises providing a cyclic redundancy check (CRC) error detection.

12. The method according to claim 8, wherein the memory comprises a NAND memory.

13. The method according to claim 8, which further comprises operating the radio circuit as an internet protocol (IP) data radio.

14. A memory system, comprising:
a write protected, non-volatile memory having a write enable controlled by a non-driver third party program outside the control of any driver used normally for wear leveling correction sequences;
a RAM;
a writeable non-volatile memory;
a driver;
a file system wherein the file system and driver are operative for retrieving a block as a suspect block upon detection of an Error Correction Code (ECC) after a page read and copying the suspect block into RAM where it is maintained for fulfilling file requests and into the writeable non-volatile memory wherein said file system and driver are configured to:
erase the suspect block from the write-protected non-volatile memory after entering a write enable mode; and
replace any erased data within the write protected non-volatile memory from data in the writeable non-volatile memory.

15. The memory system according to claim 14, wherein said write protected non-volatile memory comprises a NAND memory.

16. The memory system according to claim 14, and further comprising an integrity assurance program that erases the suspect block and replaces any erased data within the write protected non-volatile memory from data within the writeable non-volatile memory.

17. The memory system according to claim 14, wherein an ECC correction triggers a copyout routine.

18. The memory system according to claim 14, wherein said file system is operable for providing a cyclic redundancy check (CRC) error detection.

* * * * *